July 16, 1940.  H. JOHNSTON  2,207,887
CUTTING MACHINE
Filed Oct. 12, 1938  2 Sheets-Sheet 1
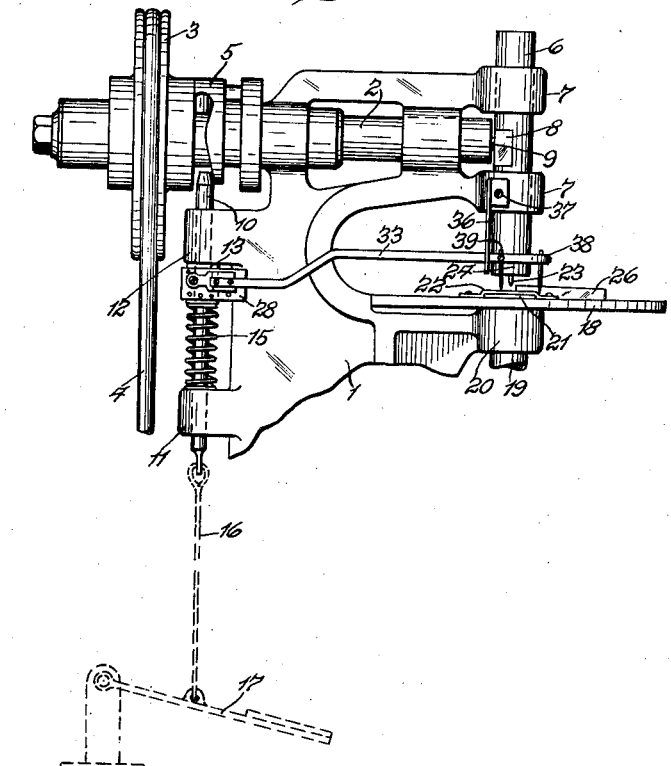

July 16, 1940.  H. JOHNSTON  2,207,887
CUTTING MACHINE
Filed Oct. 12, 1938   2 Sheets-Sheet 2
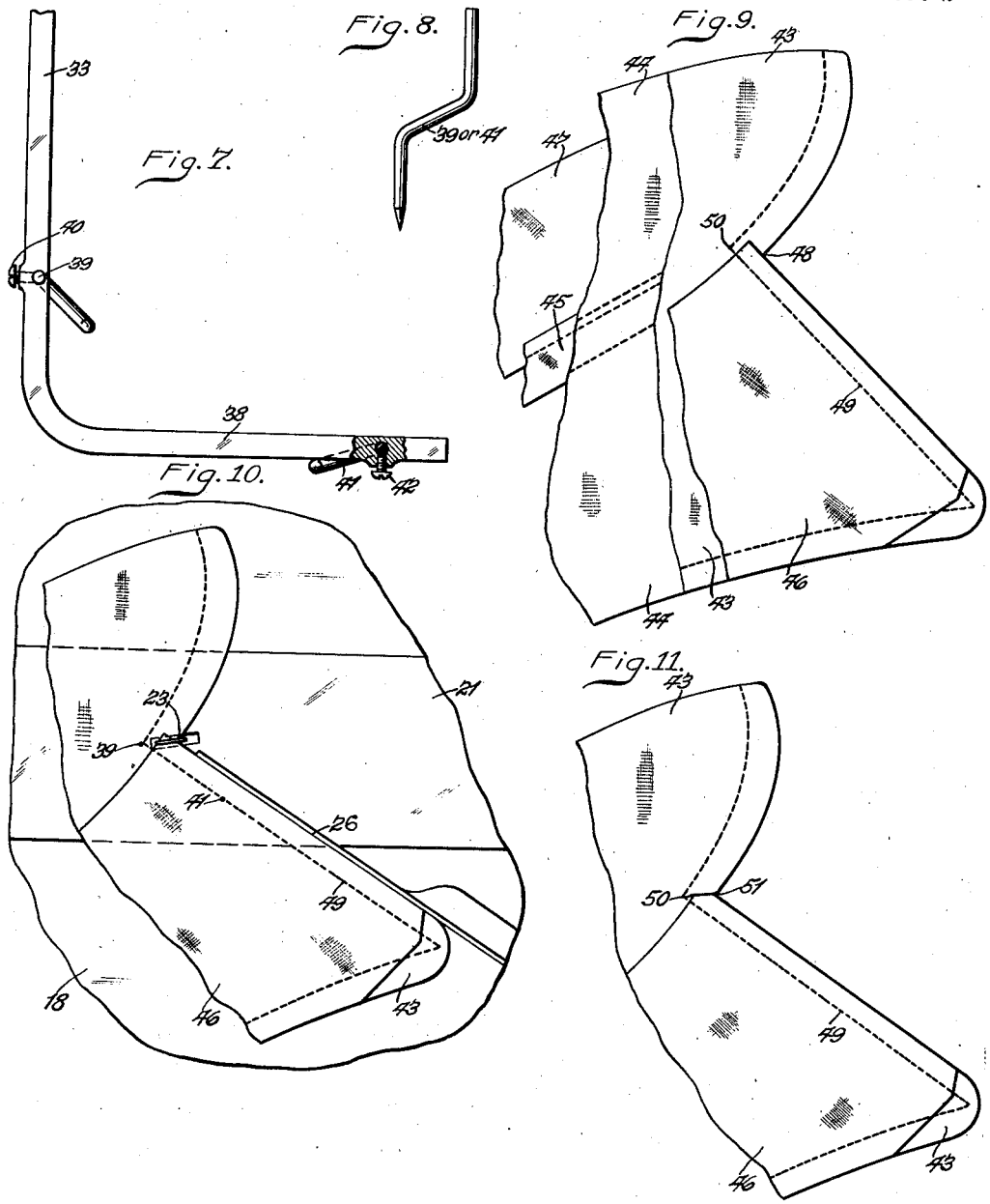

Patented July 16, 1940

2,207,887

UNITED STATES PATENT OFFICE 2,207,887

CUTTING MACHINE

Harry Johnston, St. Louis, Mo., assignor, by direct and mesne assignments, of one-half to Wilton Rubinstein, Clayton, Mo., and one-half to Wilton Rubinstein, as trustee, and Edward Greensfelder, as cotrustee Application October 12, 1938, Serial No. 234,543

5 Claims. (Cl. 164—47)

This invention relates to cutting machines; and has special reference to machines for use in cutting slits at exact locations in fabrics or other materials.

Objects of the invention are to provide mechanism for use in cutting slits in materials at approximately exact locations so as to permit the materials at opposite sides of the slits to spread apart without buckling or forming substantial wrinkles or creases and without subjecting the materials at the points or lines of separation to substantial strains and stresses; to provide a gaging and holding device for engaging and holding the materials or work in proper position for operation of the slitting mechanism to form the slits at the proper positions and of uniform length; and to provide an abutment gage to assist in locating and positioning the work for engagement by said device and for operation immediately thereafter of the slitting mechanism.

Another object of the invention is to provide an improved mechanism for cutting slits in and through the several plies of material at the corners near the union of the collar bands with the capes in men's turned-down collars, after said plies have been attached together by a marginal line of stitches running along the lower margin of the cape and along the end margins of the cape and band and before the collars have been turned to place the margins of the plies between the exposed and inner plies of the collars, so as to make the effect of the finished collar more perfect after the collar has been turned to confine the attached margins between the inner and outer plies of the collar and to render the collar more durable and lasting.

Another object of the invention is to provide a device for cutting or slitting the margins of a collar at the corners near the union of the collar bands with the capes in a manner to obtain a more perfect finish in the collar and to prevent strains and stresses at and near said corners, thereby avoiding likelihood of the collar becoming torn as a result of such strains and stresses.

Other objects of the invention will be readily apparent from the following description, reference being made to the annexed drawings, in which—

Fig. 1 is a side elevation of a machine of known construction in which the present invention is embodied.

Fig. 2 is a front elevation of the upper portion of said machine.

Fig. 3 is a plan view of the plate upon which the collars are placed and against which the cutting knife operates, and the cooperating gage.

Fig. 4 is an enlarged side elevation of a portion of the invention including the support to which the carrier element of the gaging and holding device is connected.

Fig. 5 is a horizontal sectional view approximately on the line 5—5 of Fig. 4.

Fig. 6 is a vertical sectional view approximately on the line 6—6 of Fig. 4.

Fig. 7 is a plan view of a portion of the movable gaging and holding device, a part thereof being in section.

Fig. 8 is a side elevation of one of the adjustable members of the gaging and holding device.

Fig. 9 is a broken view showing the different plies and elements of the collar after the proper plies and elements have been attached together by stitches and before operation of the present invention to form the cut or slit at the corner near the union of the collar band with the cape.

Fig. 10 is a view showing the position of the collar with respect to the gaging and holding devices and the knife.

Fig. 11 is a view showing the collar after the cut or slit has been formed therein by the present invention.

The invention is shown embodied in a Singer machine including a rigid frame 1 supporting a horizontal shaft 2 for intermittent rotation, having mounted thereon a pulley 3 engaged by a driving belt 4 and supporting a clutch device 5 controlling intermittent rotation of the shaft 2 by the constantly rotating pulley 3. The belt 4 is driven by an electric motor (not shown) or other power device. A plunger or knife carrier 6 is mounted for vertical sliding movements in bearings 7. A block 8 is mounted for lateral sliding movements in the shaft 6 and is connected with a crank 9 on the forward end of the shaft 2 so that, during each complete revolution of the shaft 2 from and to its definite starting point, the plunger or knife carrier 6 is driven downwardly from a definite starting position and returned to said definite starting position.

In these Singer machines, the clutch device 5 is controlled by a rod 10 mounted for vertical sliding movements in spaced bearings 11 and 12 formed in connection with the frame 1. An abutment collar 13 is attached to the rod 10 between the bearings 11 and 12 by a set screw 14 or otherwise, so as to engage against the underside of the bearing 12 and limit extent of upward movement of the rod 10. A spring 15 is mounted on the rod 10 between the bearing 11 and the collar 13 and constitutes an actuator to move the rod 10 upwardly into engagement with the clutch device 5 but will yield to permit downward movement of the rod 10 out of engagement with the clutch device 5. It is known that in these machines the rod 10, when engaged with the clutch device 5, maintains said clutch device in ineffective position, leaving the pulley 3 free to rotate while the shaft 2 remains stationary; and that, when the rod 10 is disengaged from the clutch device 5, said clutch device moves to effective position to cause the pulley 3 to rotate the shaft 2.

The machine includes a link 16 having its upper end pivotally connected with the lower end of the rod 10 and its lower end pivotally connected with a pedal device 17 which, by downward movement to a sufficient extent, will disengage the rod 10 from the clutch device 5, with the result that the shaft 2 will be rotated by the pulley 3. When pressure against the pedal device 17 is discontinued, the spring 15 will move the rod 10 upwardly into engagement with the clutch device 5, and said rod will disengage said clutch device from the pulley 3 and thereby stop rotation of the shaft 2 in the upward position of the plunger or knife carrier 6.

The machine includes a rigid table 18 attached to an adjusting rod 19 and mounted upon a support 20 immediately below the plunger or knife carrier 6. A plate 21 of copper or other relatively soft metal or material is detachably held upon the table 18 by holders 22 attached to said table 18 to support a part of the collar.

The present invention is embodied in a machine of this type, and comprises a knife 23 attached to a holder 24 secured to the plunger or knife carrier 6 by a clamp device 25 so that, when said plunger or knife carrier is operated as described, the knife 23 will cut or slit the work located across the plate 21. A gage 26 is detachably secured to the upper side of the table 18 by removable and replaceable fasteners 27. The operating mechanism for the plunger 6 and the devices 10, 5, etc. controlling the same are coordinated so that the plunger 6 is moved downwardly from and returned to its starting position as shown (Figs. 1 and 2) and stopped in said starting position during one complete revolution of the shaft 2 when the treadle 17 is depressed and immediately released. In its upper or starting position, the knife 23 is separated from the plate 21 by a space into which the pliant materials may be moved to position to be cut by said knife 23.

As shown, a plate 28 is rigidly attached to the collar 13 by removable and replaceable fasteners 29, and extends forwardly at one side of the frame 1 toward the table 18. The rear end of an arm 30 is connected with the plate 28 by a pivot 31 and extends forwardly at the side of said plate 28 for vertical swinging movements. In the upward position of the rod 10 the forward end of the arm 30 seats upon and is supported by a projection 32 rigid with the plate 28. An arm 33 has horizontal slots 34 near its rear end through which screws 35 extend. The screws 35 are screwed into threaded holes in the arm 30 and hold said arm 33 in rigid connection with the pivoted arm 30 for vertical swinging movements therewith. The fastener screws 35 and the slots 34 constitute means for securing the arm 33 in different longitudinal adjustments in connection with the supporting arm 30.

The arm 33 extends forwardly between a pair of spaced guide fingers 36 attached to the lower bearing 7 by a removable and replaceable fastener 37. The forward end of the arm 33 is formed with a lateral extension 38 extending transversely in front of the lower end of the plunger or knife carrier 6.

The arm 33 supports an angular pin 39 having a point 40 on its lower end adapted to function as a gage and holding device in locating and gaging and holding the collars or other work in proper position across the plate 21 for operation of the cutting or slitting knife 23. The pin 39 is capable of adjustment in various selected positions and is held in such adjusted positions by a set screw 40 mounted in the arm 33 and clamping against the pin 39. An angular pin 41 having a pointed lower end for cooperating with the pin 39 to gage and hold the collars or other work in proper position on the plate 21 is attached to the lateral extension 38 of the arm 33 and is held rigidly in any of its adjusted positions by a clamping set screw 42 (Fig. 7). It is apparent that these angular pins 39 and 41 may be turned to different adjusted positions relative to each other, the gage 26, the knife 23, and other cooperating parts, and secured in such adjusted positions by the set screws 40 and 42. When the machine is at rest and the knife 23 is supported above the plate 21 and separated therefrom by a space, the pins 39 and 41 are also separated from the plate 21 by a space into and from which the work may be moved. Movement of the pins 39 and 41 is effected by the device 10 which controls operation of the knife 23.

Portions of a pliant turned down collar in which cuts or slits may be advantageously formed by this invention at the angles located at or near the union of the collar band and cape, are shown in Figs. 9, 10 and 11. The collar comprises a unitary exposed ply 43 and a unitary infold ply 44, each extending the full length and width of the collar cape and band; a tape 45 attached to the inner surface of the infold ply along the fold line of the collar and extending a short distance into the band and also into the cape throughout the length of the collar; a cape lining section 46 and a band lining section 47 having their upper edges separated by a longitudinal intervening space along the tape 45 and along the fold line of the collar from a point adjacent to the re-entrant angle 48 at one end of the collar to a point adjacent to a similar re-entrant angle at the opposite end of the collar. As shown, these various plies of material are superimposed one upon the other and are attached together by a line of stitches 49 running along the lower margin of the cape and the end margins of the cape and band while the ultimately concealed cut margins of the infold ply 43, exposed ply 44 and cape lining section 46 are still visible. It will be understood that the collar is ultimately turned to conceal all of the margins beyond the line of stitches 49 between the infold and exposed plies of the collar. When the collar is turned, the margins at opposite sides of the re-entrant angles 48 produce an objectionable finish and also weaken the collar to such an extent that, as a result of successive washings and wear, the collar will break down and tear at the corners 48.

A point or corner 50 is formed in the line of stitches 49 where said line of stitches turns from the end margin of the collar band to the end margin of the collar cape, and the present invention forms a cut or slit 51 from the edges of the plies 43 and 44 toward, but terminating essentially short of or a distance from, the point or corner 50 at each end of the collar.

In operation of the invention to form the cut or slit 51, the collar, while the parts are still inside out and while the cut edges of the collar parts beyond the line of stitches 49 are exposed, is laid upon the table 18 across the plate 21 with the end edges of the cape parts against the gage 26, as shown in Fig. 10. Then the pedal 17 is partially depressed, thereby moving downwardly the rod 10 far enought to cause the gaging and holding pins 39 and 41 to engage and hold the collar in proper position for operation of the cutting or slitting knife 23. The pins 39 and 41, constituting a part of the gaging and holding device, may pass into or entirely through the collar material or other work, but, because of the pointed ends thereof, cause no permanent damage.

In the specific arrangement shown, the point of the pin 39 engages the collar at the angle 50 in the seam 49 and the pin 41 engages the collar at a point along the seam 49 in the cape of the collar. Thus, the gage 26 functions to assist in locating the collar in proper longitudinal position and the gage pin 39 functions to assist in locating the collar in proper position laterally because said gage pin 39 must engage the collar at the angle 50 of the line of stitches 49, and the pin 41 must engage the line of stitches 49 along the margin of the cape. This initial downward movement of the rod 10 does not permit closing of the clutch 5 and consequently the shaft 2 remains stationary until after the collar has been properly located and engaged by the gaging and holding device. Thereafter, an additional downward movement of the pedal 17 will disengage the rod 10 from the clutch 5 and permit movement of said clutch 5 into clutching engagement with the pulley 3, with consequent rotation of the shaft 2 and reciprocation of the knife carrier 6 to cause the knife 23 to form the cut or slit 51. It will be seen that the gage 26 and the gaging and holding devices 39 and 41 will hold the collar in the exact location desired to form the cut or slit 51 of proper length terminating short of the line of stitches 49. When the pedal 17 is released, the spring 15 will immediately act to raise the rod 10 into engagement with the clutch device 5 to open or release said clutch device and permit the shaft 2 to stop immediately while the knife carrier 6 is in its raised position. These known Singer machines embody construction functioning so as to stop further rotation of the shaft 2 at the time the knife carrier 6 is in its uppermost position immediately following disengagement of the clutch device 5.

The presence of the cuts or slits 51 in opposite ends of the collar permits the collar to be turned to proper relationship of the parts in which the lining sections 46 and 47 and the tape 45, as well as the cut edges of the different plies beyond the line of stitches 49, are between and concealed by the exposed ply 43 and the infold ply 44. These cuts or slits 51 also permit the adjacent portions of the margins at opposite sides thereof to spread apart without unduly straining or distorting any of the parts so that, when the collars are ironed for wear, a pleasing finish is obtained and the collar will last much longer than do other collars which are not so formed.

It should now be apparent that this invention attains all of its intended functions, objects and purposes in a highly efficient and facile manner. The invention may be embodied in the available and known Singer machines mentioned, and perhaps in other machines as well, without difficulty or great expense. Clearly, the invention may be varied widely within the scope of equivalent limits without departure from the nature and principle thereof.

I claim:

1. In a machine for cutting slits at the reentrant angles in the ends of apparel collars having the plies thereof attached together by a line of stitches spaced from the edges of said plies and forming angles adjacent to and similar to said reentrant angles; a horizontal support for the collars, a plunger mounted for vertical reciprocating movements toward and from said support, a knife attached to said plunger for cutting the collar located on said support, means attached to said support for locating the collar in position in which the points of said angles are on a line approximately in the vertical plane of said knife with the angle of the collar edge between the ends of the knife and the angle of the stitches beyond the adjacent end of the knife, a visual device for engaging and holding the collar in said position, and a longitudinally movable element for controlling operation of said plunger and thereby said knife, and also operating said device.

2. In a machine for cutting slits from an angle in the edge of an article toward the point of an angle formed on the surface of the article adjacent to said edge angle by lines parallel with the edges of said article; a horizontal support for articles to be cut, a plunger mounted for vertical reciprocating movements toward and from said support, a knife rigid with said plunger for cutting an article located on said support at each reciprocating movement of said plunger, mechanism for operating said plunger and said knife, a longitudinally movable element controlling operation of said mechanism, and visual devices operated by said element for engaging the article located on said support before initiation of movement of said plunger and knife and holding said article in position in which said knife will cut a slit in the margin thereof from said edge angle toward and terminating short of said surface angle.

3. In a machine for cutting slits from an angle in the edge of an article toward the point of an angle formed on the surface of the article adjacent to said edge angle by lines parallel with the edges of said article; a rigid support for the articles to be cut, a device attached to said support for engaging one edge of the article thereon and leaving said article free for lateral sliding movements, a visual device for engaging said article at said surface angle and along one of the lines thereof for holding said collar stationary on said support, a knife for cutting a slit from said edge angle toward said surface angle while the article is held by said devices, and an element for operating said second named device into engagement with said article and thereafter causing operation of said knife to cut said slit while said device engages said article.

4. In a machine for cutting slits from an angle in the edge of an article toward an angle formed on the surface of the article at a distance from said edge angle by lines spaced from and parallel with the edges of said article; a rigid support for articles to be cut, a plunger mounted for reciprocating movements toward and from said support, a knife attached to said plunger for cutting an article located on said support at each reciprocating movement of said plunger, mechanism for operating said plunger and said knife, visual devices for engaging the article located on said support and holding said article in position in which said knife will slit the margin thereof from said edge angle toward and terminating short of said surface angle, and an element for operating said devices into engagement with said article and thereafter controlling said mechanism to operate said plunger to cut said article and to stop said mechanism after a single operation of said plunger.

5. In a machine for cutting slits from an angle in the edge of an article toward an angle formed on the surface of the article at a distance from said edge angle by lines spaced from and parallel with the edges of said article; a rigid support for articles to be cut, a reciprocating knife movable toward and from said support to cut articles located on said support, a visual device for engaging the article on said support at the point of the surface angle on said article, means cooperating with said device to prevent movement of said article in any direction while said device is in engagement with said article, mechanism for operating said knife, and means for operating said device into engagement with said article and thereafter controlling operation of said mechanism to cut a slit from the edge angle of said article toward the surface angle thereon while said device is in engagement with said article.

HARRY JOHNSTON.